United States Patent Office 3,218,058
Patented Nov. 16, 1965

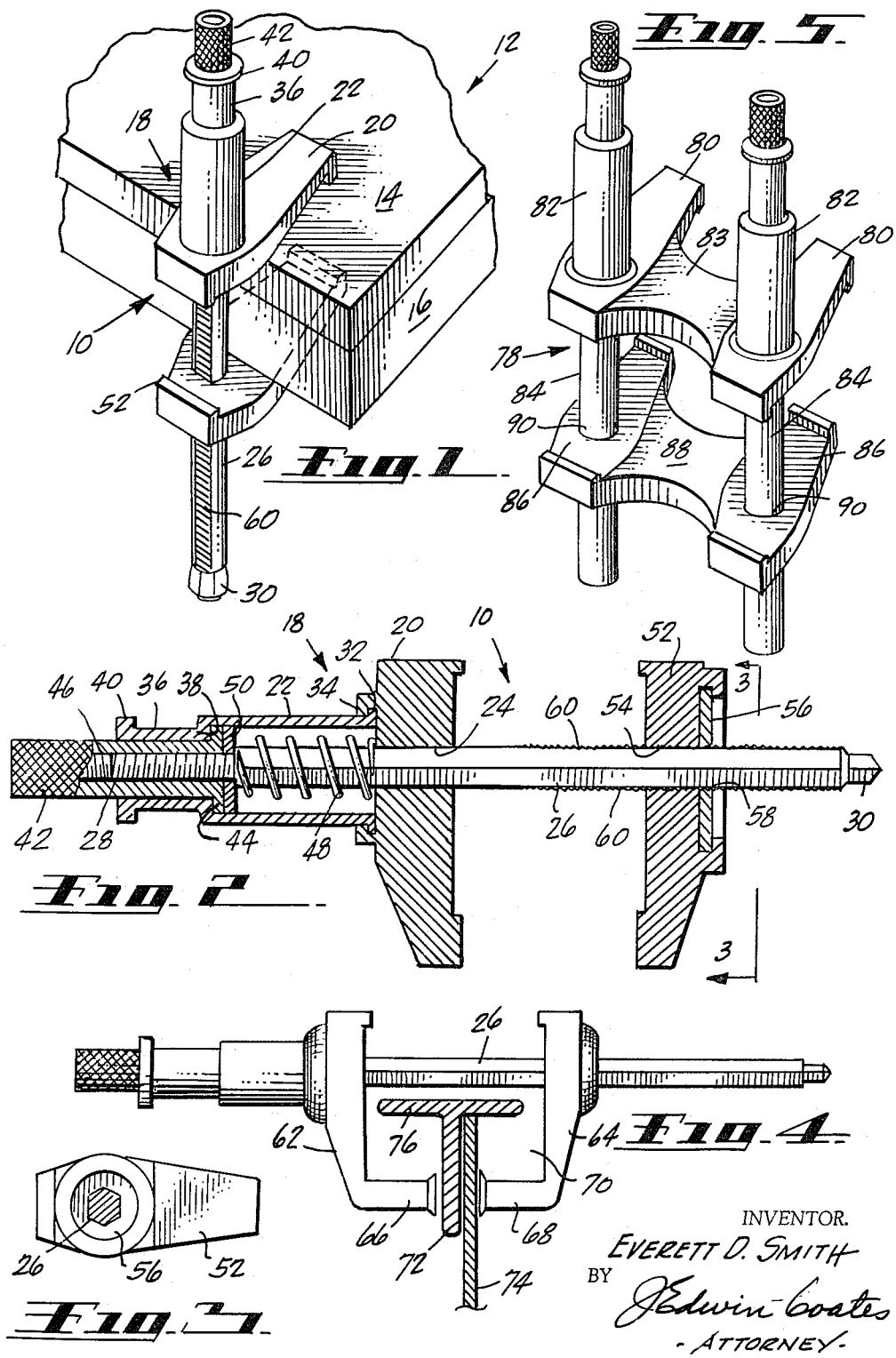

3,218,058
QUICK ADJUSTABLE CLAMP
Everett D. Smith, Lynwood, Calif., assignor to Monogram Industries, Inc., Culver City, Calif.
Filed Feb. 17, 1964, Ser. No. 345,237
5 Claims. (Cl. 269—166)

This invention is in the field of quick acting clamps and is directed particularly to such a clamp having a jaw which is rapidly adjustable from a position of minimum grip length to a position of very large maximum grip length and is instantly securable in any position of adjustment for application of clamping pressure.

There are clamps presently available which have a large range of grip length adjustment obtained by making one jaw integral with one arm of a yoke and carrying the other jaw on a long rod threaded into the other arm of the yoke. While a clamp of this kind is easily adjustable, the adjustment is rather slow because of the necessary rotation of the rod carrying the movable jaw. It can exert a rather high clamping force because of the mechanical advantage of the screw thread, and it is quite suitable for holding several work pieces in a desired relation while drilling or riveting. However, the grip length is of fixed size for any given adjustment of the threaded rod and is not suitable for clamping work pieces together which are being cemented and must be held tightly until the cement sets. In most cases the cement flows to some extent during the setting period, reducing the total thickness of the material being held, and the fixed grip length makes the clamp loose and ineffective.

Another type of clamp which is quite suitable for gripping work pieces to be cemented comprises a body having a gripping jaw secured to it and a beam slidable through a limited distance with respect to the body and the jaw. A resilient force unit carried by the body is connected to one end of the beam and is operable to extend it a short distance against the pressure of a spring and allow it to retract under the force of the spring. The other end of the beam has a jaw rigidly fixed to it to co-operate with the first jaw. In operation the force unit is actuated to separate the jaws to encompass the work pieces, and on partial retraction the jaws grip the work pieces with a resilient force. As the cement flows, the jaws resiliently follow the work pieces and continue to grip them tightly enough to retain them in proper relation until the cement is set. A small amount of adjustment of the basic unloaded grip length between the jaws can be obtained by a short screw-threaded connection between the force unit and the end of the beam. However, this is very limited and in small clamps amounts to less than an inch. In addition, because of the screw threads, the adjustment is slow. Since the range of adjustment is small it is not possible to make such a clamp which will pass a large obstruction at the margin of the work pieces and still grip the pieces themselves when they are thin.

The present invention overcomes the difficulties mentioned above and provides a clamp with a range of adjustment of grip length from zero to as large as desired, and with a capability of passing large marginal obstructions and yet firmly gripping thin work pieces. In addition the adjustment is practically instantaneous and is securely set as desired. The new clamp uses a body and first gripping jaw substantially the same as that described above. A force unit carried by the body is attached to a first or captive end of a beam and is operable to extend and retract the beam through a short distance. The beam itself is straight and elongate and of any length desired, its free end being spaced from the body. A second gripping jaw has a passage therethrough for slidable engagement with the beam and may be moved to any position of adjustment along the exposed portion of its length. At least a portion of the passage is so formed that it cocks into binding engagement with the beam when the jaw is eccentrically loaded. The primary gripping end of the jaw is well spaced laterally of the passage so that any pressure on the jaw will produce the necessary eccentric load to cause binding.

One or both of the jaws may be provided at their ends with extensions projecting toward the opposing jaw. Because of the relatively unlimited grip length range it is possible for the jaws to clear a large obstacle at the margin of the work piece assembly. The jaw extensions provide a clearance throat so that the clamp can freely encompass the obstruction and yet the jaws can grip a very thin assembly of work pieces.

In one preferred form, the jaws have non-circular passages corresponding to the non-circular cross section of the beam to prevent relative rotation and misalignment. In another form, dual jaws are used together with a pair of beams having a cylindrical cross section. The beams are carried by the body portion in parallel spaced relation and the dual jaws are rigidly united to each other. Consequently, although a single jaw would rotate about its axis on a cylindrical beam, the dual jaws are prevented from doing so by the arrangement of dual beams.

Various other advantages and features of novelty will become apparent as the description proceeds in conjunction with the accompanying drawing in which:

FIGURE 1 is a perspective view of the clamp of this invention grippingly engaging a work piece assembly;

FIGURE 2 is a longitudinal sectional view through the clamp of FIGURE 1;

FIGURE 3 is an end view of the movable jaw of the clamp taken in the direction of line 3—3 of FIGURE 2;

FIGURE 4 is a side elevational view of a modified form of the clamp gripping a work piece assembly, with the latter shown in section; and FIGURE 5 is a perspective view of a modified form of the basic clamp.

The invention in one of its preferred forms is generally illustrated in FIGURE 1, in which clamp 10 is arranged in gripping engagement with an assembly 12 of work pieces 14 and 16. In a typical case of utilization of the invention, pieces 14 and 16 would be assembled as shown with cement between them and a series of clamps such as 10 would be applied along the margins to hold the assembly in proper relation until the cement has set. During the setting period the cement gradually flows under the applied pressure, and the assembly becomes significantly thinner. If the jaws had been set by fixed mechanical linkage, such as screw threads or toggles, they would become loose on thinning of the assembly and completely useless for the intended purpose. However the clamp of this invention has a resilient follow-up action so that it continues to grip the assembly as the thickness diminishes.

The clamp comprises a body 18 including a first gripping jaw 20 and a housing 22 secured to the jaw. A passage 24 is formed in the jaw and slidably receives a portion of beam 26 which has a threaded captive end 28 and a free end 30 deformed to serve as a stop. Jaw 20 is preferably a die casting, and housing 22 has an external flange 32 locked within flange 34 on the casting. Housing 22 also has a section 36 of reduced diameter producing an internal shoulder 38. Section 36 terminates in an external flange 40 for reception of an operating tool.

Plunger 42 is seated for sliding movement in section 36 and is provided with a flange 44 to engage shoulder 38 to limit its travel in a leftward direction as viewed in FIGURE 2. The plunger has a threaded passage 46 to receive the captive end 28 of beam 26 so that they will reciprocate in unison. Spring 48 located within the chamber of housing 22 is under compression and acts through washer 50 against flange 44 to urge the plunger leftwardly or outwardly. A plier-like tool of the well known type illustrated in the Jones Patent No. 3,044,512 can be engaged with flange 40 and the free end of plunger 42 to urge the plunger inwardly against the force of spring 48, extending beam 26 a short distance with respect to jaw 20. When the tool is released, the spring urges the plunger and beam toward retracted position.

A second gripping jaw 52 is slidably mounted on beam 26 by means of passage 54. This jaw likewise is preferably a casting of relatively soft metal. Both jaws are so formed that their extremities are located a substantial distance laterally of passages 24 and 54, which may be said to be eccentrically located. The result is that any axially directed gripping pressure exerted at the extremities of the jaws will eccentrically load them and tend to cock or tilt them with respect to beam 26. Since jaw 20 is entirely of soft metal, the cocking tendency will not result in binding, and therefore beam 26 will remain slidable in passage 24 as required in the clamping operation.

On the other hand, jaw 52 must be movable instantly to any desired position of adjustment and must instantly lock in such position in order to perform its quick adjustable clamping function. The major portion of the jaw is the same cast metal as used in jaw 20 so it will slide just as freely. However, a retainer which will lock the jaw instantly in desired position is provided in the form of a disk or washer 56 which is secured to the jaw in any suitable fashion, as by casting or molding in place. The retainer is of very hard material, preferably hardened steel, and is provided with a passage 58 which is a snug fit on beam 26.

The jaw slides readily on the beam as long as the moving force is applied substantially concentrically, but as soon as force is applied at the jaw extremity the eccentric load cocks or tilts the jaw and retainer and the hard and sharp edges of the retainer engage the surface of the beam in binding relation. While it is not essential, it is desirable to provide fine serrations on some of the walls of the beam, as indicated at 60, to increase the binding effect. It will be seen that the jaw 52 is readily and instantly slidable to any desired position of adjustment and may be instantly locked by applying an eccentric load.

While the jaws shown are preferably metal die castings, they may also be made of molded plastic for various special purpose applications.

With the construction described above a clamp is provided which has an unloaded grip opening instantly available from zero to the maximum provided by the length of the beam 26. To avoid cumbersomeness, various lengths of beam are provided to cover reasonable ranges of work piece sizes. The maximum practical length, of course, is that at which the beam bends undesirably under the load applied. In use, the movable jaw may be set to give an unloaded grip opening somewhat smaller than the thickness of the work piece assembly. The plier type tool of the type illustrated in the Jones Patent No. 3,044,512 is then applied to portions 40 and 42 urging the plunger inwardly of housing 22 against the force of spring 28, and beam 26 is extended a short distance so that the jaws can encompass the work. The tool is then relaxed and the resilient force unit including spring 48 and its associated parts resiliently retracts beam 26 until the jaws firmly grip the work. If the thickness of the work decreases because of cement flow or cold flow of the material the force unit will continue to pull the jaws into gripping engagement with the work.

In practice, it has been found that the most desirable way to apply the clamp is to first apply the plier type tool to extend beam 26 as far as possible, then bring the clamp over the work as indicated in FIGURE 1, then move jaw 52 as close as possible to jaw 20, and then relax the tool. The jaws will then grip the work piece assembly with the spring fully compressed so that maximum pressure is obtained as well as maximum capability to follow the work down if the thickness decreases.

In order to keep the jaws in proper alignment with each other at all times the beam 26 and passages 24 and 54 are non-circular and matched to each other so that no relative rotation can occur. They are shown as hexagon shaped but other non-circular shapes may be used, as well as keys and keyways.

The modification illustrated in FIGURE 4 is particularly adapted to handle the situation where the work pieces such as 72 and 74 are quite thin but one or more of them has a large marginal protuberance 76 which must be passed before the jaws can engage the work. In this form, the clamp in general is the same as that of FIGURE 2, but jaws 62 and 64 have integral extensions 66 and 68 respectively which project toward each other so that when they are in clamping position there is a large throat 70 which will encompass protuberance 76 without interference. The jaws must be brought apart far enough to clear the protuberance and then brought together to engage the work for each operation and the advantage of the instant adjustability of the jaw is quite apparent.

A further modification, illustrated in FIGURE 5, accomplishes the dual purpose of preventing relative rotation of the jaws without the use of non-circular beams and doubling the gripping power while using standard force units. In this form, body 78 includes first gripping jaw means 80 and force units 82 which are basically the same as those of FIGURE 2. The jaw means may be joined by web 83 as shown or may be adjacent to each other and joined to form a unitary wide jaw. The force units are connected to cylindrical beams 84 and extend and retract them in the same way as the single beams. Two plier type tools may be used or a single tool may be provided with dual jaws.

Second gripping jaw means 86 may be joined by web 88 or made unitary as described above with reference to jaw means 80. They are provided with passages 90 to slide on beams 84 and with retainers, not shown, which operate in the same way as retainer 56 in FIGURE 2. The two beams are held in spaced parallel relation and thus prevent relative rotation of jaw means 80 and 86. Since there are two force units, each of the standard size and strength of the unit of FIGURE 2, the gripping power is doubled. Since the force units are identical the total cost of manufacture is less than that of making different sizes for different loads.

It will be apparent to those skilled in the art that various changes and modifications may be made in the construction and arrangement of parts as disclosed without departing from the spirit of the invention, and it is intended that all such changes and modifications shall be embraced within the scope of the following claims.

I claim:

1. A beam clamp gripping jaw adapted to be slidably mounted on a beam for adjustable axial movement thereon to selected positions and to be temporarily secured at said selected positions, comprising: a jaw having a passage therethrough for sliding engagement with a beam and extending a substantial distance laterally of the axis of said passage; the main portion of said jaw being of relatively soft material; and a securing member carried by said jaw; said securing member being thin and of relatively hard material and having a passage therethrough in axial alignment with the passage in the jaw to slidingly engage said beam; said securing member being tiltable into binding frictional engagement with said beam upon application of an eccentric load to said jaw.

2. A gripping jaw as claimed in claim 1; said jaw being a casting of relatively soft metal and said securing member being a washer of relatively hard metal inserted in said casting.

3. A quick adjustable clamp comprising: a body; a first gripping jaw secured to said body; an elongate beam slidably mounted for limited axial movement with respect to said body and said first jaw and having a captive end terminating at said body and a free end spaced therefrom; a second gripping jaw slidably mounted on said beam for movement along the major portion of the length of said beam to select positions of adjustment; a resilient force unit connected to the captive end of said beam and operable to extend said beam from its retracted position to its limited extended position and to retract said beam forcefully to apply a resilient gripping force; said second jaw being formed of relatively soft material; and a retainer of relatively hard materal carried by said second jaw at the side remote from said first jaw and operative to engage and bind with said beam upon application of an eccentric load to said second jaw to retain it in its adjusted position on said beam during gripping operation.

4. Quick adjustable clamping means comprising: body means; first gripping jaw means connected to said body means; a pair of elongated beams in parallel spaced relation slidably mounted for limited axial movement with respect to said body means and said first jaw means; each of said beams having a captive end terminating at said body means and a free end spaced therefrom; second gripping jaw means slidably mounted on said beams for movement along a major portion of the length of said beams to selected positions of adjustment thereon and having retainer means to bindingly engage said beams to prevent relative sliding movement of said jaw means during gripping operation; said pair of beams serving to prevent relative rotation of said first and second gripping jaw means; and a pair of resilient force units carried by said body and each attached to the captive end of one of said beams and operable to extend its respective beam from its retracted position to its limited extended position and to retract said beam forcefully to apply a resilient gripping force between said first and second jaw means.

5. A quick adjustable clamp comprising: a body; a first gripping jaw secured to said body; an elongate beam slidably mounted for limited axial movement with respect to said body and said first jaw through a short distance compared to the length of said beam; said beam having a captive end terminating at said body and a free end spaced therefrom; a second gripping jaw slidably mounted on said beam for movement along the major portion of the length of said beam between said free end and said body and including means to temporarily secure it to said beam in selected positions of adjustment wherein it moves axially with said beam; and a resilient force unit attached to the captive end of said beam and yieldable to manual force to permit extension of said beam from its retracted position to its limited extended position; said force unit being operable to retract said beam forcefully to apply a resilient gripping force; the limited axial movement of said beam providing a correspondingly narrow range of grip opening lengths between said jaws and the adjustable positioning of said second jaw on said beam serving to greatly increase the range of grip opening lengths; said second jaw being formed of relatively soft material and including an insert of relatively hard material to engage said beam in binding relation.

References Cited by the Examiner
UNITED STATES PATENTS

| | | | |
|---|---|---|---|
| 2,040,669 | 5/1936 | Odmark | 269—166 X |
| 2,779,364 | 1/1957 | Farmer | 269—153 X |
| 3,033,559 | 5/1962 | Lindholm | 269—166 X |
| 3,044,512 | 7/1962 | Jones | 269—154 |

WILLIAM W. DYER, JR., *Primary Examiner.*

ROBERT C. RIORDON, *Examiner.*